US012499939B2

(12) United States Patent
Taherinejad

(10) Patent No.: US 12,499,939 B2
(45) Date of Patent: Dec. 16, 2025

(54) MEMRISTIVE LOGIC GATE CIRCUIT

(71) Applicant: Technische Universität Wien, Vienna (AT)

(72) Inventor: Nima Taherinejad, Vienna (AT)

(73) Assignee: Technische Universität Wien, Vienna (AT)

( * ) Notice: Subject to any disclaimer, the term of this patent is extended or adjusted under 35 U.S.C. 154(b) by 102 days.

(21) Appl. No.: 18/030,834

(22) PCT Filed: Sep. 28, 2021

(86) PCT No.: PCT/EP2021/076640
§ 371 (c)(1),
(2) Date: Apr. 7, 2023

(87) PCT Pub. No.: WO2022/073802
PCT Pub. Date: Apr. 14, 2022

(65) Prior Publication Data
US 2023/0298664 A1    Sep. 21, 2023

(30) Foreign Application Priority Data
Oct. 8, 2020 (AT) .............................. A 50862/2020

(51) Int. Cl.
G11C 13/00 (2006.01)
H03K 19/00 (2006.01)

(52) U.S. Cl.
CPC ...... *G11C 13/0007* (2013.01); *G11C 13/0038* (2013.01); *G11C 13/004* (2013.01); *H03K 19/0024* (2013.01)

(58) Field of Classification Search
CPC ............ G11C 13/0007; G11C 13/0038; G11C 13/004; H03K 19/0024
USPC ......................................................... 365/148
See application file for complete search history.

(56) References Cited

U.S. PATENT DOCUMENTS 8,619,457 B2 * 12/2013 Lee ...................... G11C 13/004
365/100
8,773,167 B2 * 7/2014 Robinett .............. H03K 19/173
326/38

(Continued)

FOREIGN PATENT DOCUMENTS

| CN | 102811051 A    | 12/2012 |
|----|----------------|---------|
| CN | 108449080 A1   | 8/2018  |
| WO | 2014020478 A2  | 2/2014  |
| WO | 2017144862 A1  | 8/2017  |

OTHER PUBLICATIONS

Halawani Yasmin et al: "Stateful Memnstor-Based Search Architecture", IEEE Transactions on Very Large Scale Integration (VLSI) Systems, IEEE Service Center, Piscataway, NJ, USA, vol. 26, No. 12, Nov. 30, 2018 (Nov. 30, 2018), pp. 2773-2780, XP011702478, ISSN: 1063-8210, DOI: 10.1109/TVLSI.2018.2812800 [retrieved on Nov. 30, 2018].

(Continued)

*Primary Examiner* — Amir Zarabian
(74) *Attorney, Agent, or Firm* — Dykema Gossett PLLC

(57) ABSTRACT

Memristive logic gate circuit, comprising a first memristive device (1), representing a first input node A of the logic gate circuit, a second memristive device (2), representing a second input node B of the logic gate circuit, and a third memristive device (3), representing an output node F of the logic gate circuit, wherein the first memristive device (1) and the second memristive device (2) are connected in series between a positive supply voltage terminal Vx (7) and a negative supply voltage terminal −Vx (8), wherein a connection point (6) is formed between the first memristive device (1) and the second memristive device (2), and wherein the third memristive device (3) is provided between the connection point (6) and a Ground contact (9).

11 Claims, 9 Drawing Sheets

(56) References Cited

U.S. PATENT DOCUMENTS

| | | | |
|---|---|---|---|
| 10,318,242 B2 * | 6/2019 | Swartzlander | G06F 7/501 |
| 10,516,398 B2 | 12/2019 | Kvatinsky et al. | |
| 11,189,345 B2 * | 11/2021 | Liu | G11C 13/0069 |
| 2014/0035620 A1 | 2/2014 | Lin et al. | |
| 2015/0019468 A1 | 1/2015 | Nugent et al. | |
| 2015/0256178 A1 | 9/2015 | Kvatinsky et al. | |
| 2016/0020766 A1 | 1/2016 | Miao et al. | |

OTHER PUBLICATIONS

D. Radakovits, N. Taherinejad, M. Cai, T. Delaroche and S. Mirabbasi, "A Memristive Multiplier Using Semi-Serial IMPLY-Based Adder," in IEEE Transactions on Circuits and Systems I: Regular Papers, vol. 67, No. 5, pp. 1495-1506, May 2020, doi: 10.1109/TCSI.2020.2965935.

G. Papandroulidakis, I. Vourkas, N. Vasileiadis and G. C. Sirakoulis, "Boolean Logic Operations and Computing Circuits Based on Memristors," in IEEE Transactions on Circuits and Systems II: Express Briefs, vol. 61, No. 12, pp. 972-976, Dec. 2014, doi: 10.1109/TCSII.2014.2357351.

M. R. Alam, M. H. Najafi and N. Taherinejad, "Exact In-Memory Multiplication Based on Deterministic Stochastic Computing," 2020 IEEE International Symposium on Circuits and Systems (ISCAS), Seville, Spain, 2020, pp. 1-5, doi: 10.1109/ISCAS45731.2020.9180743.

S. Shin, K. Kim and S.-M. Kang, "Resistive Computing: Memristors-Enabled Signal Multiplication," in IEEE Transactions on Circuits and Systems I: Regular Papers, vol. 60, No. 5, pp. 1241-1249, May 2013, doi: 10.1109/TCSI.2013.2244434.

* cited by examiner

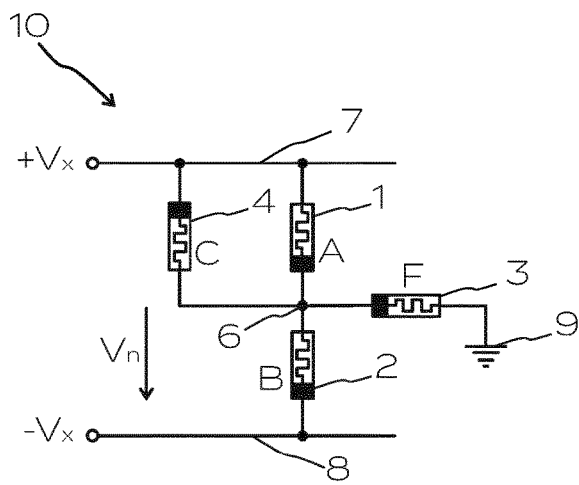
Fig. 1a
Fig. 1b
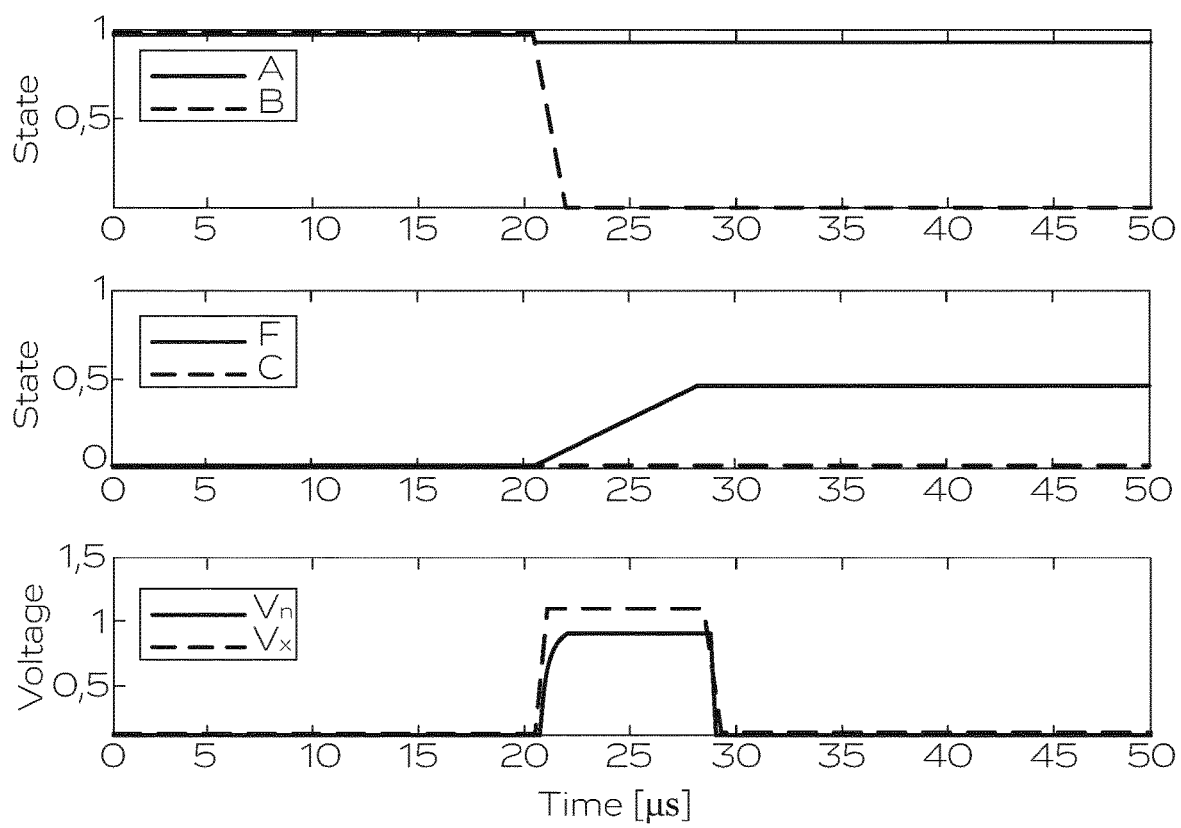
Fig. 1c

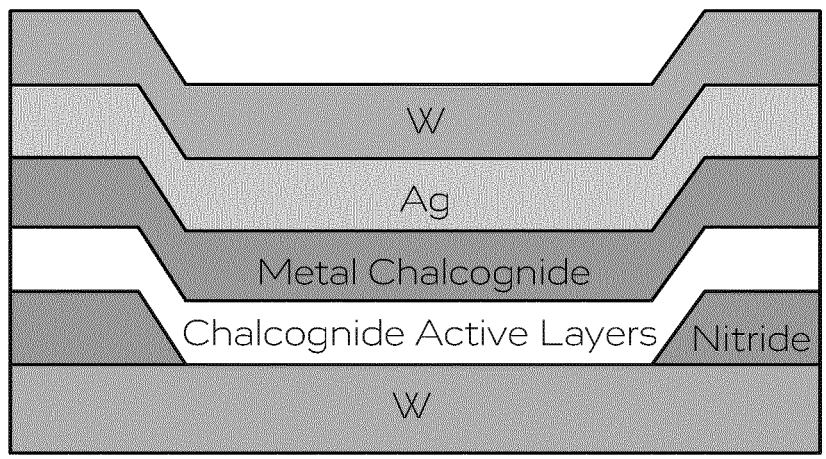

Fig. 3a

| Parameter | Explanation |
|---|---|
| $v_{off}$ | Positive thershold voltage. |
| $v_{on}$ | Negative threshold voltage. |
| $k_{off}$ | State change rate during SET. |
| $k_{on}$ | State change rate during RESET. |
| $\alpha_{off}$ | Degree of (non-)linearity for SET. |
| $\alpha_{on}$ | Degree of (non-)linearity for RESET. |
| $a_{off}$ | Window boundary for SET. |
| $a_{on}$ | Window boundary for RESET. |
| $w_c$ | Shaping parameter for window function. |
| $w_{off}$ | Value of state variable at HRS. |
| $w_{on}$ | Value of state variable at LRS. |
| $R_{off}$ | Resistance at HRS. |
| $R_{on}$ | Resistance at LRS. |

Fig. 3b

| Parameter | $v_{off}$ | $v_{on}$ | $a_{off}$ | $a_{on}$ | $R_{off}$ | $R_{on}$ |
|---|---|---|---|---|---|---|
| Value | 0,7 V | -10mV | 3 | 3 | 1 MΩ | 10 kΩ |

| $k_{on}$ | $k_{off}$ | $w_{off}$ | $w_{on}$ | $w_C$ | $a_{off}$ | $a_{on}$ |
|---|---|---|---|---|---|---|
| -0,5 nm/s | 1 cm/s | 0 nm | 3 nm | 100 pm | 3 nm | 0 nm |

Fig. 3c

MEMRISTIVE LOGIC GATE CIRCUIT

CROSS-REFERENCE TO RELATED APPLICATION

This application is a national stage filing based upon International application No. PCT/EP2021/076640, filed 28 Sep. 2021, which claims the benefit of priority to Austria application No. A 50862/2020, filed 8 Oct. 2020.

BRIEF SUMMARY

The invention relates to a memristive logic gate circuit and a memristive memory array comprising such a circuit.

BACKGROUND

Memristive devices, also known as memristors, are two-terminal, non-volatile electrical components based on resistance switching. They have been theoretically predicted in the year 1971, completing a theoretical quartet of fundamental electrical components comprising the resistor, capacitor and inductor. First memristive devices were realized in the year 2008 using a layered composite of titanium dioxide with platinum electrodes. In these devices, the electrical resistance between the two terminals is not constant, but depends on the amount and direction of electrical charge that had passed through, i.e., its present resistance depends on how much electric charge has flowed in what direction through it in the past. When the electric power supply is turned off, the memristor remembers its most recent resistance until a new flow of charge changes that resistance.

Memristive devices can thus be switched from a high resistance state (HRS="OFF", logical "0") to a low resistance state (LRS="ON", logical "1") by applying a voltage which is higher than a first predetermined threshold voltage, and from the high resistance state to the low resistance state by applying a voltage which is a lower than a second predetermined threshold voltage. Between these voltages, the device keeps its resistance.

Memristive devices can be built in large arrays in a very compact fashion and have thus been incorporated into non-volatile memory architectures. They can store data and, at the same time, perform logical operations and calculations (so-called In-Memory Computation, IMC), which reduces unnecessary data transfer and alleviates the so-called Von-Neumann bottleneck, which is the inherent limitation on throughput caused by the standard computer architecture.

To this end, so-called stateful logic implementations were proposed, where both input and output values of a logic function are represented as the internal resistance state of memristive devices in a crossbar memory array. For example, U.S. Pat. No. 10,516,398 B2 proposes a memristive logic gate circuit based on unipolar memristors connected in series to form an OR gate. A major advantage is that no separate read or write operations are necessary to perform the logical operation, thus speed can be increased and power consumption reduced. Such memristive logic gates can be fabricated within a crossbar memory, opening the opportunity to perform logic within the memory, enabling new computer architectures.

However, none of the existing memristive logic gate circuits offer the possibility to perform XOR operations in a single cycle; they need at least the combination of OR- and NAND-like operations in two consecutive cycles to realize XOR functionality.

Thus, the object of the invention is to provide a memristive logic gate circuit to perform single-cycle XOR operations using existing memristive devices arranged in a crossbar memory array.

This object is solved by a circuit with the features according to claim 1.

SUMMARY OF THE INVENTION

According to the invention, a memristive logic gate circuit is provided, which comprises a first input memristive device A, a second input memristive device B, and an output memristive device F. The first input memristive device A and the second input memristive device B are connected in series between a positive supply voltage terminal $V_x$ and a negative supply voltage terminal $-V_x$.

A connection point is formed between the first input memristive device A and the second input memristive device B, and the output memristive device F is provided between the connection point and a Ground contact.

In an embodiment of the invention, at least one first auxiliary memristive device C is provided between the connection point and the positive supply voltage terminal $V_x$.

In a further embodiment of the invention, at least one second auxiliary memristive device D is provided between the connection point and the negative supply voltage terminal $-V_x$.

Exemplary embodiments of the memristive devices to be used in a memristive logic gate circuit according to the invention might comprise a layered solid-state material construction as manufactured by the company Knowm Inc., for example in a layered structure identical or similar to the structure of commercially available memristor type Knowm BS-AF-W as is shown in FIG. 3a. Any or all of the memristive devices A, B, C, D, F might have a bipolar switching characteristics.

Any or all of the memristive devices A, B, C, D, F switch from a high resistance off-state (HRS) to a low resistance on-state (LRS) when its voltage exceeds a threshold voltage $V_{th}^{on}$, where the supply voltage $V_x \geq V_{th}^{on}$.

In an embodiment of the invention, the threshold voltages of the memristive devices A, B, C, D, F and/or the supply voltage are chosen in such a way to fulfill the condition $$V_{th}^{on} \leq \frac{k_2+3}{k_2-2} V_{th}^{on} \leq V_x < \frac{k_4+3}{k_4-2} V_{th}^{on} < 2V_{th}^{on}$$

wherein $k_2$ and $k_4$ are technology dependent values. In typical embodiments of the invention, the value of $k_2$ is approximately $$k_2 = \frac{R_{HRS}}{R_{HRS} \| R_{LRS}} = \frac{R_{HRS} + R_{LRS}}{R_{LRS}}$$

where $R_{HRS}$ and $R_{LRS}$ denote the resistance of the memristors in the high resistance state and the low resistance state, respectively.

In typical technologies, such as the memristors manufactured by the company Knowm Inc, $R_{HRS}$=545 kΩ with a standard deviation of 77 kΩ and $R_{LRS}$=4.64 kΩ with a standard deviation of 0.43 kΩ, which makes the values of $k_2$ approximately 100 and $k_4$ approximately 7. The value of $k_2$ is typically around 10 to 20 times higher than the value of $k_4$.

In an embodiment of the invention, the logic gate circuit is adapted to operate as a logic XOR gate, with the first input memristive device representing a first input node A, the second input memristive device representing a second input node B, and the output memristive device representing an output node F.

In further embodiments of the invention, any or all of the memristive devices, in particular the first auxiliary memristive device the second auxiliary memristive device or both comprise two or more memristive devices each, which are connected in parallel.

The invention further provides a memristive memory device comprising a memristive logic gate circuit according to the invention and electronic circuitry to write the state of the first and second input memristive devices and read the state of the output memristive device, in particular a row decoder and a column decoder which are connected to an electronic memory controller. The memristive memory device might be realized by discrete memristive devices or by an integrated circuit comprising a large array of memristive devices, in particular a two-dimensional or a three-dimensional crossbar memory array.

The invention further provides a method for performing a logic operation on a memristive logic gate circuit according to the invention. The method comprises the steps of using the state of the first input memristive device to represent a logic input node A, using the state of the second input memristive device to represent a logic input node B, and reading the state of the output memristive device.

Here, the states of the first input memristive device and the second input memristive device might already be stored in the devices, or might be provided during the method.

Thus, an input voltage can be applied to the first input memristive device representing the logic input node A, a second input voltage can be applied to the second input memristive device representing the logic input node B, and the state of the output memristive device representing the logic output node F can then be read out. During operation, a supply voltage can be applied to the circuit.

The method can be used to apply an XOR operation on the logic states of input nodes A and B, with the result represented by the logic state of output node F.

Many such XOR operations might be performed without any actual read and write operations, since the values of input nodes A and B might already be stored in the first and second input memristive devices and used several times without changes.

The logical state of a memristive device according to this invention can be represented as resistance, where high and low resistances are considered, respectively, as logical zero and one. The input and output of the logic gates are the logical states of the first and second input memristive devices A and B, and the output memristive device F.

To operate the memristive logic gate, the third (output) memristor is initialized to a known logical state, namely the high resistance state or logical zero, and input voltages are applied to the first and second (input) memristors. The voltage at the output memristor depends on the logical states of the input and output memristors. The nonlinearity characteristics of the memristors, which produce effective threshold currents and/or voltages, are exploited to maintain correct operation. For certain inputs, the voltage is sufficient to change the logical state of the memristors, i.e., the voltage/current is greater than the threshold, while for other input cases the state of the memristor remains unchanged, the voltage/current is below the threshold.

The operation voltages which are applied to any or all of the memristors might be provided as single long voltage pulse or as a series of short voltage pulses. Providing the memristor operation voltages in the form of a series of short impulses has the advantage that runaway currents in the memristors might be avoided.

Runaway currents in memristors might be caused by positive feedback, when thermal heating reduces the energy barrier of the memristor, thus causing a spurious transition and switching of the state of the memristor. Breaking one long input signal into a series of short pulses prevents stress and internal heating of the memristor and thus effectively avoids or reduces run-away currents. Similarly, the voltage applied to read the output memristor might be provided as a series of short voltages pulses in order to reduce runaway currents in the output memristor.

The invention is not limited to circuits with symmetrical supply voltages, but can also be applied in the case of asymmetrical supply voltages. Thus, the absolute values of the voltages at the positive supply voltage terminal and the negative supply voltage terminal might be different. For example, the voltage at the positive supply voltage terminal might be +1.2V and the voltage at the negative supply voltage terminal might be −0.8V, when measured in reference to the potential of the Ground contact.

BRIEF DESCRIPTION OF THE DRAWINGS

Further features of the invention will become apparent from the following claims, figures, and description of embodiments.

FIG. 1a shows a schematic illustration of an exemplary embodiment of a memristive logic gate circuit according to the invention;

FIG. 1b shows a truth table for an XOR operation of the circuit in FIG. 1a;

FIG. 1c shows a state change in the resistive states of the memristive devices of the circuit in FIG. 1a over time;

FIG. 3a shows an exemplary embodiment of a memristive device to be used in a memristive logic gate circuit according to the invention;

FIG. 3b shows an extract of the parameters in the VTEAM simulation model used;

FIG. 3c shows exemplary values used for the circuit simulation using the VTEAM model;

FIGS. 5a-5d show measurement results of a prototype memristive logic gate circuit according to FIG. 1a.

DETAILED DESCRIPTION

Figure 2A:
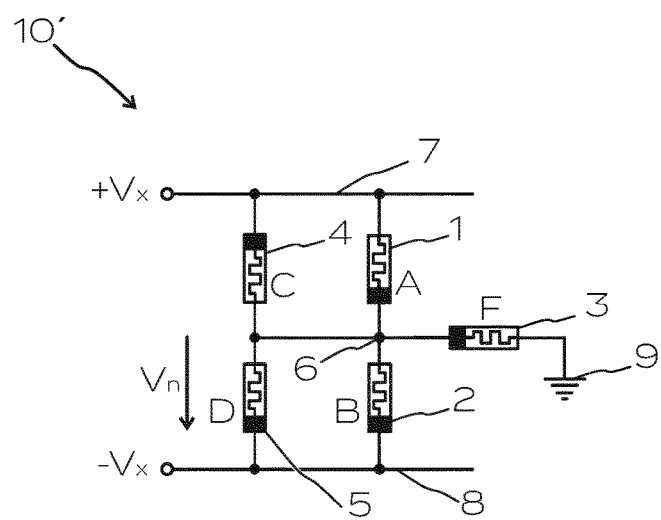
FIG. 2a shows a schematic illustration of a further embodiment of a memristive logic gate circuit according to the invention.

FIG. 1a shows a schematic illustration of an exemplary embodiment of a memristive logic gate circuit 10 according to the invention. The logic gate circuit 10 comprises a first input memristive device 1 (memristor A), representing a first input node of the logic gate circuit, a second input memristive device 2 (memristor B), representing a second input node of the logic gate circuit, and an output memristive device 3 (memristor F), representing an output node for storing the result of the logic gate circuit 10. In this illustration, the plus pole of a memristive device is symbolized by a thick black line.

The first input memristive device 1 and the second input memristive device 2 are connected in series and with identical polarity between a positive controlled supply voltage terminal $V_x$ 7 and a negative controlled supply voltage terminal $-V_x$ 8, wherein a connection point 6 is formed between the first input memristive device 1 and the second input memristive device 2, and wherein the output memristive device 3 is provided between the connection point 6 and a Ground contact 9. In this embodiment, a first auxiliary memristive device 4 (memristor C) is provided between the connection point 6 and the positive supply voltage terminal $V_x$ 7.

The memristive devices switch from a high resistance off-state (HRS) to a low resistance on-state (LRS) when the voltage applied to them exceeds a threshold voltage $$V_{th}^{on},$$

where the supply voltage $$V_x \geq V_{th}^{on}.$$

The operation of the logic gate circuit 10 is described in correspondence to the truth table of the logic XOR function shown in FIG. 1b.

At start, the memristors F and C are initialized to High Resistance State (HRS) or logic '0'. Therefore, at the beginning of each operation, F and C are virtually open circuit. During the operation, in Cases 1 and 4 of the XOR truth table shown in FIG. 1b, given that A and B are in the same state and have a similar resistance, the voltage of the connection point 6, $V_n$, will be virtually ground, keeping memristor F at its original state logic '0'.

In Case 3, memristor B is virtually an open circuit and memristor A is virtually short, hence memristor F sees $V_x$ across it and changes its state from logic '0' to logic '1'.

In Case 2, memristor A is open and memristor B is short, which brings the connection node 6 to $-V_x$. This should have no effect on F, however, since C sees 2 $V_x$ across itself, it changes status from '0' to '1'. During this process, the current passing through B changes its status from '1' to '0', leaving C the only memristor in Low Resistance State (logic '1'). Since C is now conducting, the voltage at the connection node 6, $V_n$, rises to approximately $V_x$, which causes a state change in memristor F, from '0' to '1'. Hence, this circuit fulfills all the cases of the truth table of XOR in FIG. 1b.

Even though this circuit is functional, in Case 4, there is an undesired effect. Since both memristors A and B are in their LRS and conduct, current going through them, as shown in FIG. 1c, causes a spurious state change in memristor B. This loss of status brings the circuit practically to Case 3, which initiates a state change in memristor F. Even though this state change in F, due to the limited pulse-width, is not completed a significant state drift is observed.

FIG. 2a shows a schematic illustration of a further embodiment of a memristive logic gate circuit 10' according to the invention. In this embodiment, a second auxiliary memristive device 5 (memristor D) is provided between the connection point 6 and the negative supply voltage terminal $-V_x$, denoted as terminal 8. Memristor D is initiated to '0' (HRS). Given the circuit topology, memristor D can never switch its state and will always remain in HRS.

Figure 2B:
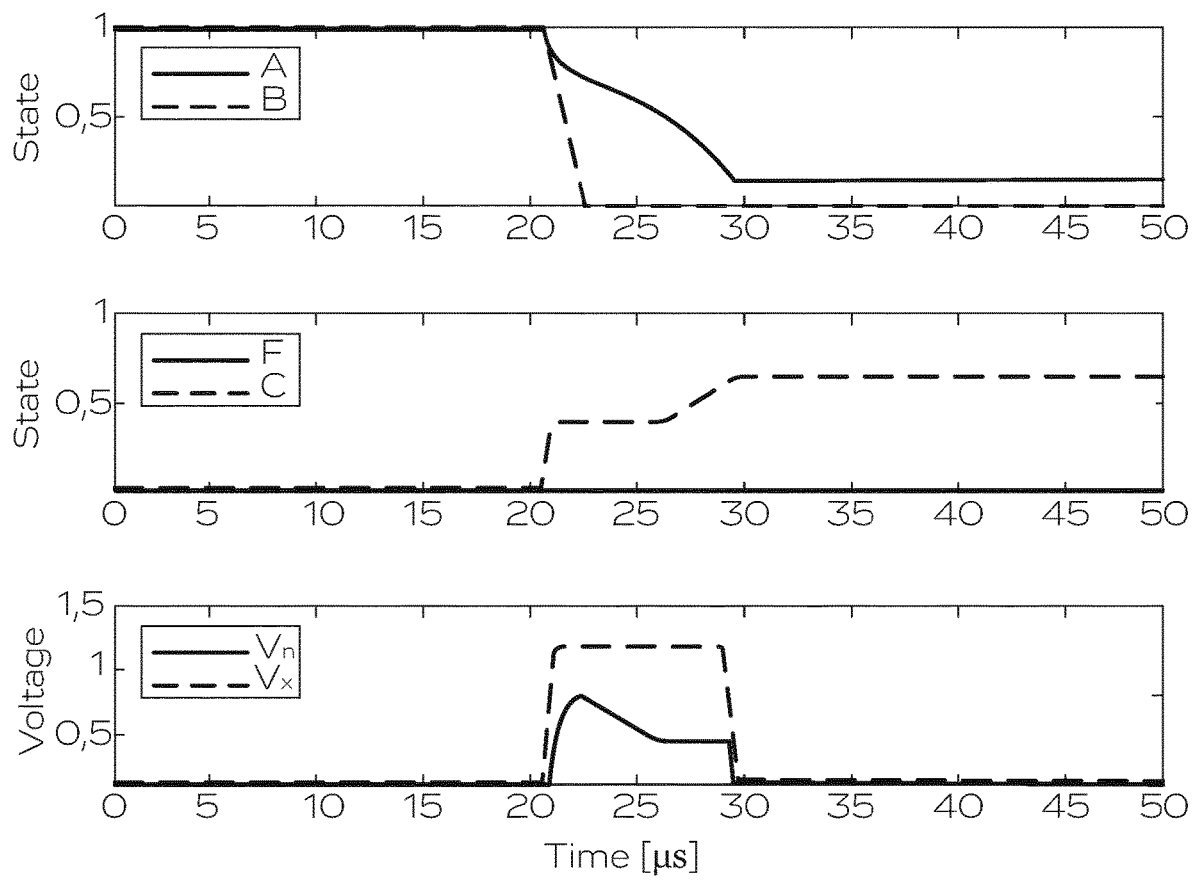
FIGS. 2b and 2c show the resistive states of the memristive devices of the circuit in FIG. 2a over time during operation.

Whenever memristor B is in LRS ('1'), D is open circuit in comparison and plays virtually no role in the circuit. However, when memristor B is in its HRS, since memristors B and D will be in the same order of magnitude, their parallel constellation leads to an equivalent resistance approximately half of their individual values. This lowers the voltage of $V_n$, in particular in Case 4 after B changes from '1' to '0' to a voltage below the threshold voltage of F and prevents its drift. The result of this operation can be seen in FIG. 2b.

Figure 2C:
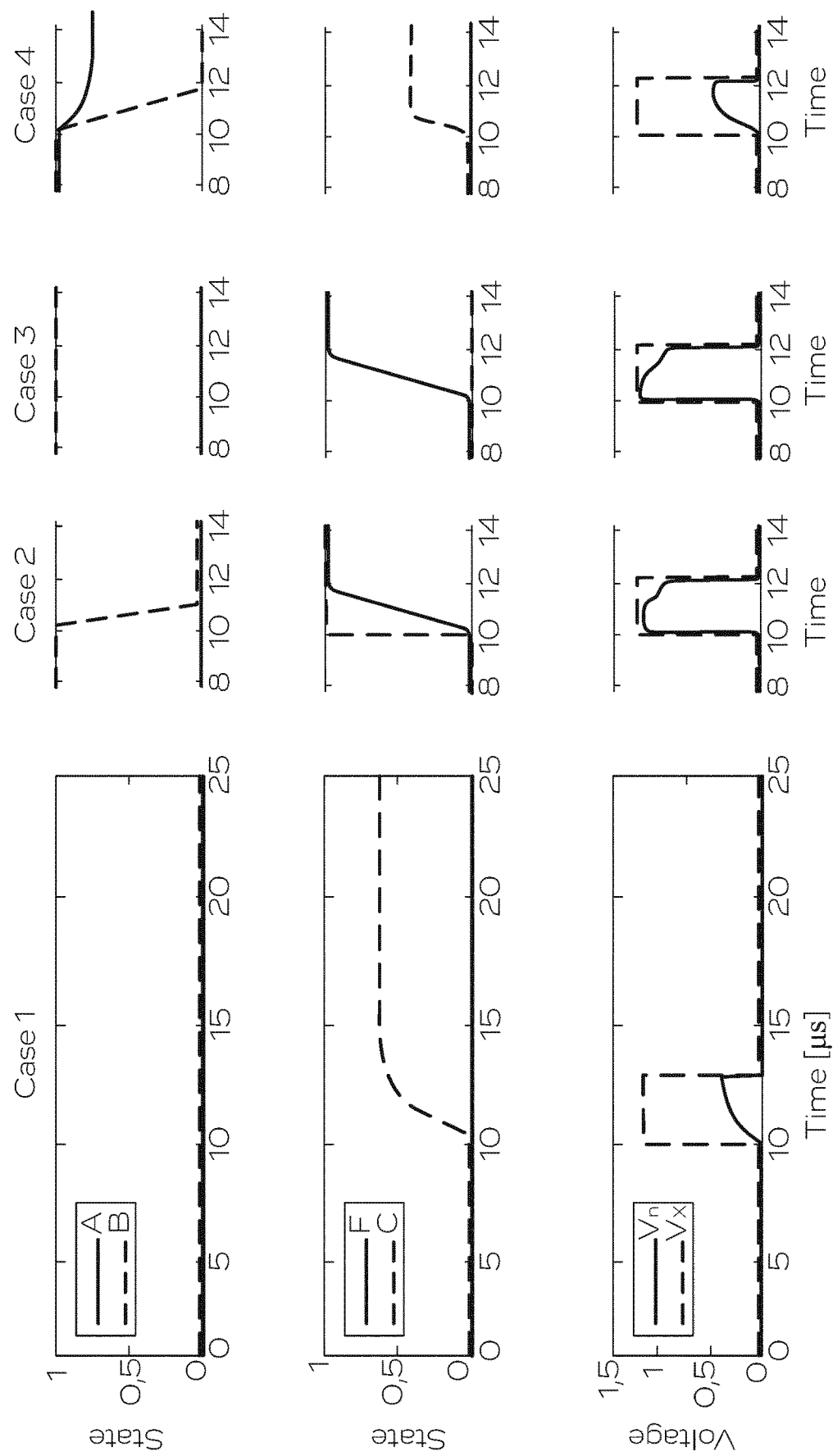

In Case 2, a similar behavior should be observed, however, since in that case memristor B experiences a much slower change (memristor A is open), memristor F already begins a state change, which further delays the voltage drop at $V_n$. Thus, as shown in FIG. 2c, Case 2 provides a correct output, with no state drift in memristor F. Moreover, by reducing the duration of operation, as shown in in FIG. 2c, an undesired state change in memristor A can be prevented in all cases. However, input memristor B loses its state after the operation in Case 2 and Case 4.

FIG. 3a shows an exemplary embodiment of the structure a memristive device to be used in the logic gate circuit according to the invention, namely the commercially available memristor type Knowm BS-AF-W.

The design of a logic gate circuit 10 according to the invention is verified by SPICE simulations in LTSpice. To model the behavior of the memristors, the Voltage-controlled ThrEshold Adaptive Memristor (VTEAM) model implemented in SPICE is used.

FIGS. 3b and 3c show the relevant design parameters of the VTEAM model and their values used for simulation. These values were obtained by measurements to fit the model to the physical Knowm memristor mentioned above. In all design experiments, $V_x$=1.2V and the pulse duration is 20 μs for FIGS. 1b and 2b, and 2 μs for the rest of simulations. As FIG. 2c shows, for all cases the simulations lead to correct results. On average, over all four combinations of the inputs, the proposed circuit has a power consumption of 225.5 nW and an energy consumption of 181.1 pJ.

It has to be noted that the minimum operation delay power and energy consumption of memristive circuits depend heavily on the model—or the technology—used for the implementation of the circuit.

In the following, the design constraints for each case in the truth table according to FIG. 1b are analyzed. In order to have any state changes in memristor F, the condition $$V_x \geq V_{th}^{on} \qquad (1)$$

must hold, where $$V_{th}^{on}$$

is the threshold voltage of a memristor going from HRS to LRS. Other case specific constraints are as follows.

In Case 1, the main constraint is keeping F in its initial state by ensuring $$V_n < V_{th}^{on}.$$

Given the symmetry of the circuit, the voltage at the connection point 6, $V_n=0$ at the beginning and as long as $$(V_x - V_n) < 2V_{th}^{on}$$

or equivalently, $$V_x < 2V_{th}^{on} \quad (2)$$

none of the memristors should switch. The only concern in this case is the slow rise of $V_n$ due to state change in C, which affects the timing. This rise can be faster if $V_x$ has a value close to the maximum dictated by the condition $$V_x < 2V_{th}^{on}$$

above. In the proximity of 1.5

$$V_{th}^{on}$$

and the optimum timing (minimum time required for full state change in F in all cases) this effect is negligible. Even in few times larger periods this has no functional effect on the proposed XOR operation.

In Case 2, the main constraint is $$V_n > V_{th}^{on}. \quad (3)$$

The memristor C sees $2V_x$, which, following Eq. (1), is significantly larger than $$V_{th}^{on}.$$

Thus, C quickly changes its state to LRS, during which memristor B also changes to HRS. If the parallel resistance of A and C is $R_H/k_2$, where $R_H$ is the memristance in HRS and $k_2$ is a constant coefficient, we have $$V_n \approx \frac{k_2}{k_2+3}V_x + \frac{2}{k_2+3}(-V_x) \geq V_{th}^{on}. \quad (4)$$

This gives $$V_x \geq \frac{k_2+3}{k_2-2}V_{th}^{on}. \quad (5)$$

In a technology such as tungsten chalcogenide Resistive Random Access Memories (ReRAMs) of the company Knowm Inc., where $R_H \approx 100 R_L$ ($R_L$ being the memristance in LRS), $k_2=101$ and Eq. (4) is estimated by $V_x$. By replacing this in Eq. (3), a good approximation is $$V_x \geq 1.05 V_{th}^{on}.$$

In Case 3, the constraints and equations which govern Case 2 are to be considered. The reason is that in effect, again one memristor is short to $V_x$ (this time A itself and C is open), and two open memristors (B and D) are in the path of node n to $-V_x$.

In Case 4, the main constraint is $$V_n < V_{th}^{on},$$

which is valid at the beginning of the cycle since $V_n=0$ due to symmetry of the circuit (the same value of resistance connects node n to $V_x$ and $-V_x$, creating a virtual ground at that node). However, this symmetry is broken when due to the passing current B loses its state and draws current from A and C. In that case, assuming that here the resistance of the parallel connection of $R_A$ and $R_C$ is $R_H/k_4$, where $k_4$ is a coefficient representing the drift of memristor A and C in an abstract manner, the value of $V_n$ is $$V_n \approx \frac{k_4}{k_4+3}V_x + \frac{2}{k_4+3}(-V_x) < V_{th}^{on}, \quad (6)$$

or $$V_x < \frac{k_4+3}{k_4-2}V_{th}^{on}. \quad (7)$$

Now, in this case, both A and C have drifted from LRS and HRS and the value of k cannot be estimated with 100, given the highly non-linear nature of memristors. In the example case of FIG. 2c, $R_A=0.18 R_H$ and $R_C=0.6 R_H$, which gives $k_4=7.2$. This means the condition $$V_x < 1.96 V_{th}^{on}$$

must hold.

In summary, all design constraints can be expresses as $$V_{th}^{on} \leq \frac{k_2+3}{k_2-2}V_{th}^{on} \leq V_x < \frac{k_4+3}{k_4-2}V_{th}^{on} < 2V_{th}^{on}, \quad (8)$$

where $k_2$ and $k_4$ are technology dependent values.

In typical embodiments, the values of $k_2$ and $k_4$ can be calculated based on the following equations:

$$k_2 = \frac{R_{HRS}}{R_A \| R_C}$$

where $R_A$ and $R_C$ are the resistance of memristor A and C at the end of operation in Case 2, and $$k_4 = \frac{R_{HRS}}{R_A \| R_C}$$

where $R_A$ and $R_C$ are the resistance of memristor A and C at the end of operation in Case 4.

At the end of Case 2, memristor A is open and memristor C is short, so $R_A$ is $R_{HRS}$ and $R_C$ is $R_{LRS}$. At the end of Case 4, however, neither of the memristors is in LRS or HRS; memristor A is close to HRS and memristor C is close to LRS. The value of $k_4$ is thus decided based on the acceptable drift/deviation from LRS and HRS. As a rule of thumb, it is reasonable to assume a roughly one order of magnitude difference between $k_2$ and $k_4$. In the example case of memristors with the technology of the company Knowm Inc. and $k_2=100$, $k_4=7.2$ this leads to the condition $$1.05\, V_{th}^{on} \le V_x < 1.96\, V_{th}^{on}, \qquad (9)$$

Figure 4A:
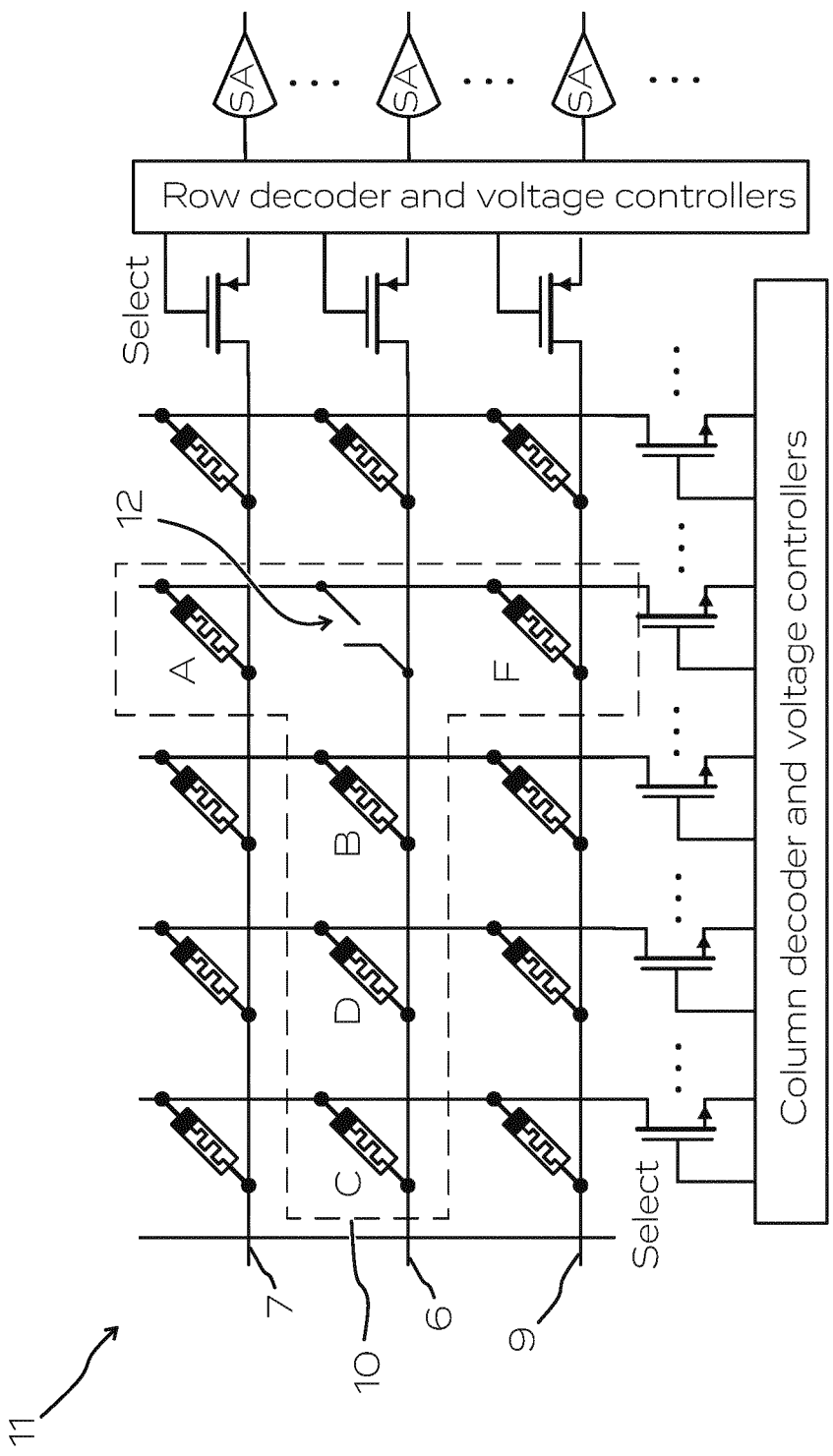
FIGS. 4a-4b show exemplary embodiments of a two-dimensional and a three-dimensional memory array comprising a logic gate circuit according to the invention.

FIG. 4a shows an exemplary embodiment of a crossbar memory array 11 comprising a logic gate circuit 10 according to the invention. The memristive devices are arranged in a rectangular array between row lines and column lines. The column lines are coupled to switches and to column decoders and voltage controllers. The row lines are coupled to switches and to row decoders and voltage controllers, and are connected to sense amplifiers (SA). The five memristors A, B, C, D, and F which form the logic gate circuit 10 are marked by a dashed rectangle.

A switch 12 is symbolically provided to connect the Word Line of connection point 6 to a Bit Line. In an implementation of the circuit, this switch will be a part of the decoder or controller circuitry outside of the memory crossbar and can be implemented with little to no change to the existing circuitry.

Figure 4B:
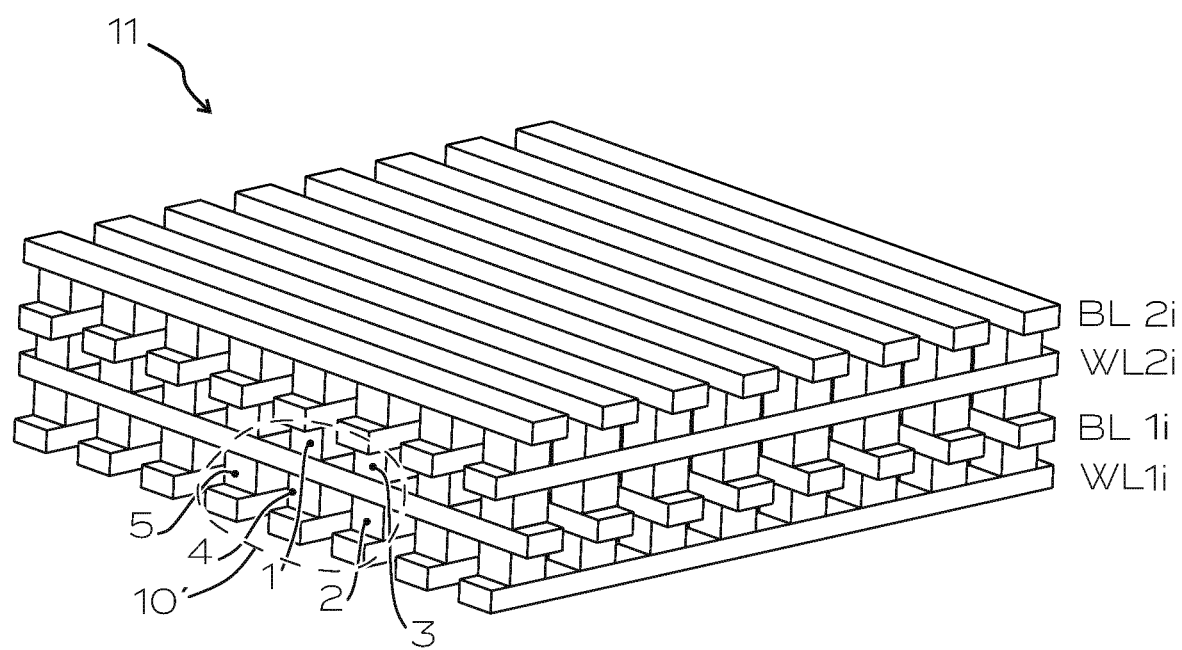

FIG. 4b shows a further exemplary embodiment of a three-dimensional crossbar memory array 11 comprising a logic gate circuit 10' according to the invention, wherein the memristive devices 1, 2, 3, 4, 5 are arranged in a three-dimensional array between bit lines BL 1i, BL 2i and word lines WL 1i, WL 2i provided in different levels on the chip.

FIGS. 5a-5d show measurement results of a prototype memristive logic gate circuit according to the schematic as shown in FIG. 1a. The figures show the measured values of the output memristor's resistance in kΩ over time in Cases 1-4 according to the following table:

| Case | Input A | Input B | Output F | Measured resistance of F |
|---|---|---|---|---|
| 1 | 0 (HRS) | 0 (HRS) | 0 (HRS) | 326 kΩ = 0 |
| 2 | 0 (HRS) | 1 (LRS) | 1 (LRS) | 11 kΩ = 1 |
| 3 | 1 (LRS) | 0 (HRS) | 1 (LRS) | 62 kΩ = 1 |
| 4 | 1 (LRS) | 1 (LRS) | 0 (HRS) | 382 kΩ = 0 |

It shall be noted that pulsed read-out measurements have been performed on the output memristor F.

Here, logical 0 represents the high resistance state (HRS) and logical 1 represents low resistance state (LRS). In each case, the measured resistance corresponds to the expected logical state of the output memristor F.

Figure 5A:
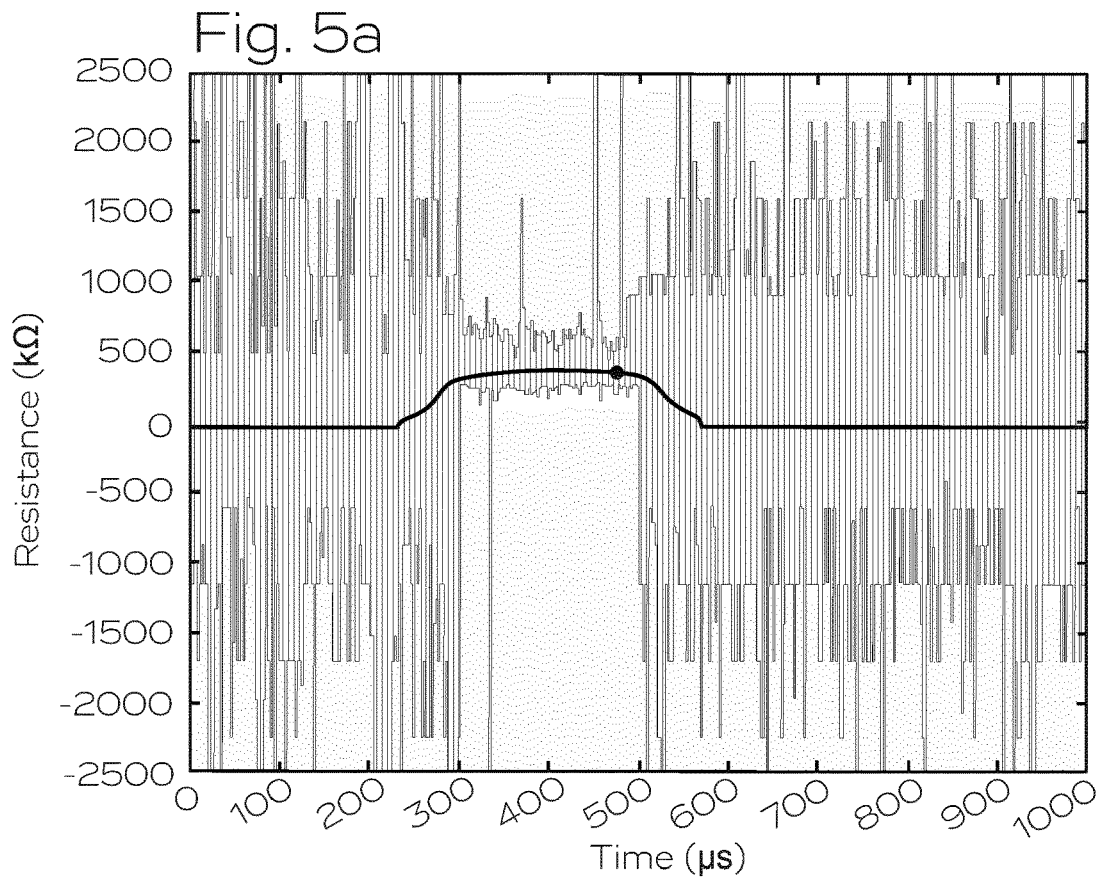

FIG. 5a shows the measured output resistance of the output memristor F in Case 1. In this case, the voltage across the memristor stays too low to cause a state change (even though a small current can pass through it). Hence, during the read process shown in the figure, the output memristor shows a high resistance state (326 kΩ), indicated by the dark dot, which is the correct expected result (logical value 0 for both inputs having a logical value of 0).

Figure 5B:
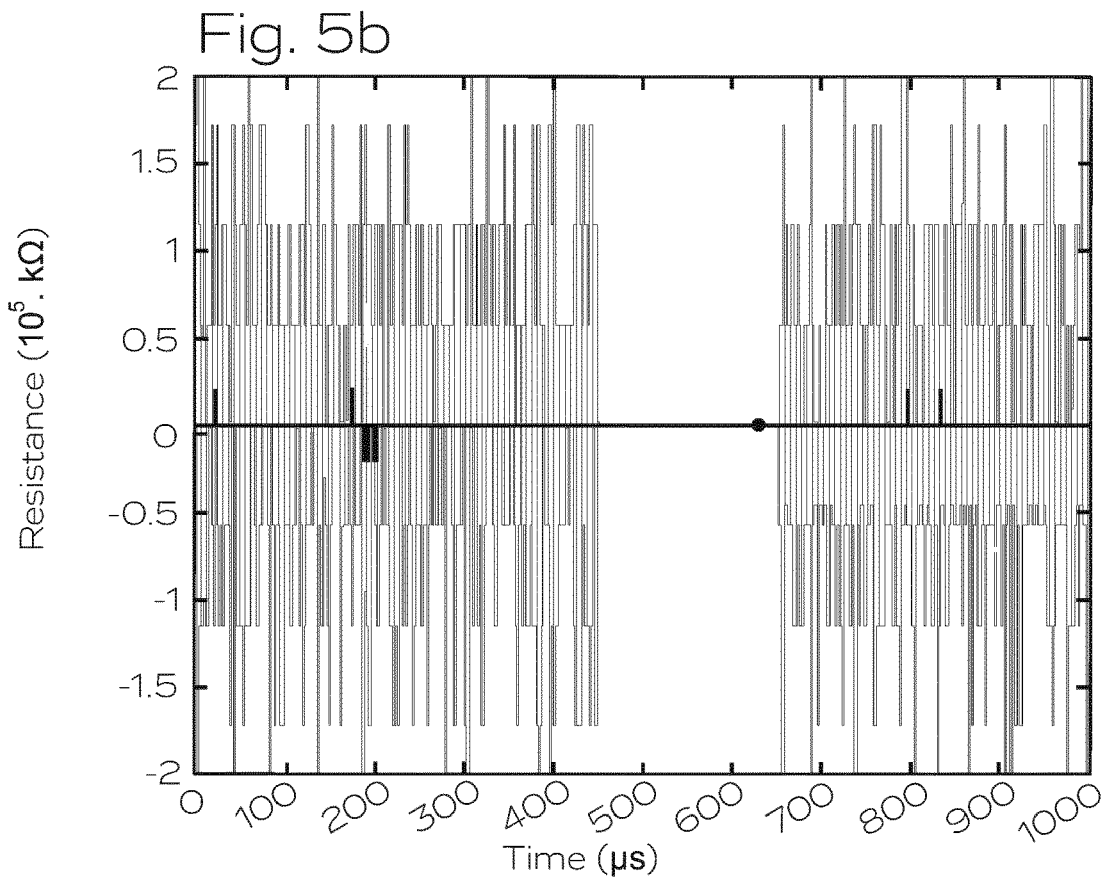

FIG. 5b shows the measured output resistance of the output memristor F in Case 2. In this case, the output memristor was set to logical 0 or high resistance state and after the operation the read signal shows a low resistance of 11 kΩ, indicated by the dark dot. This implies that when only one of the inputs (in this case B) has a logical value of 1 (LRS), the output correctly changes to a logical value of 1 (LRS which is here 11 kΩ).

Figure 5C:
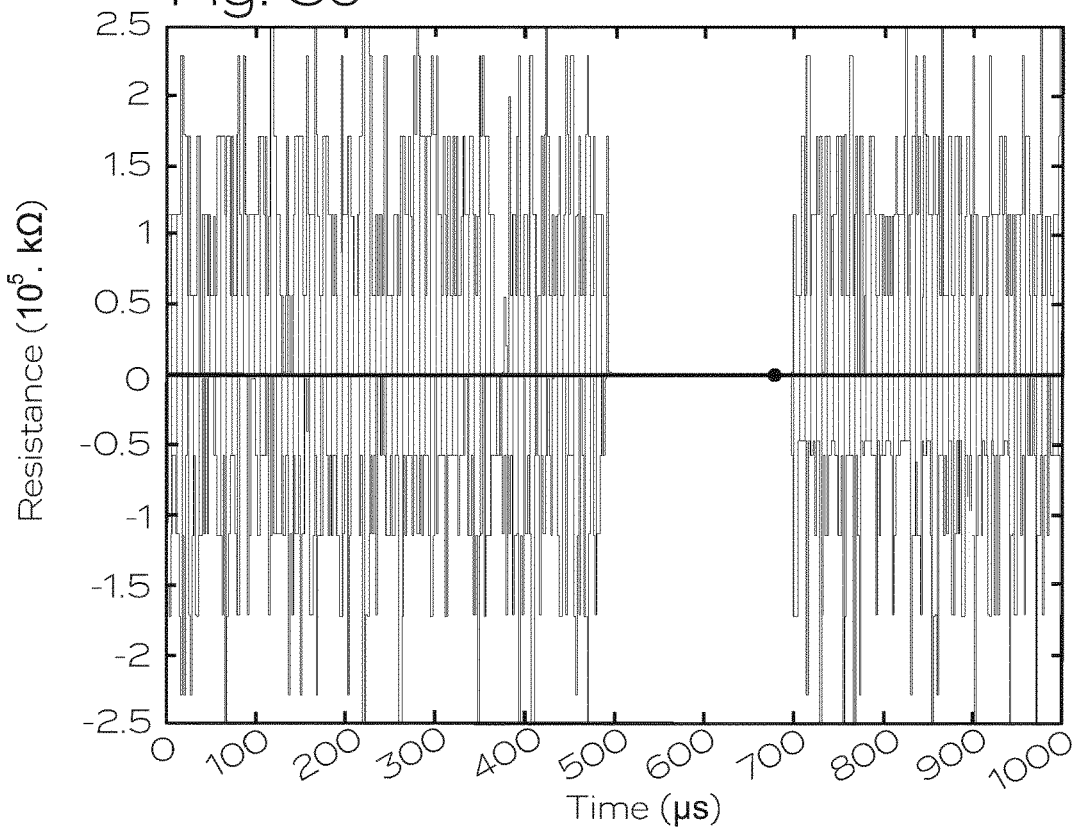

FIG. 5c shows the measured output resistance of the output memristor F in Case 3. Similar to Case 2, the output memristor was initialized to logical 0 (high resistance).

As seen in FIG. 5c, after the operation, the output memristor has changed to logical 1 (low resistance), which is the correct answer for when only one input (in this case A) has a logical value of 1 (LRS) and the other is 0 (B=HRS). In this case, the resistance at the indicated dark dot is around 62 kΩ. This is not as low as in Case 2, however, it is well below the logic threshold, which is set at around 200 kΩ.

Figure 5D:
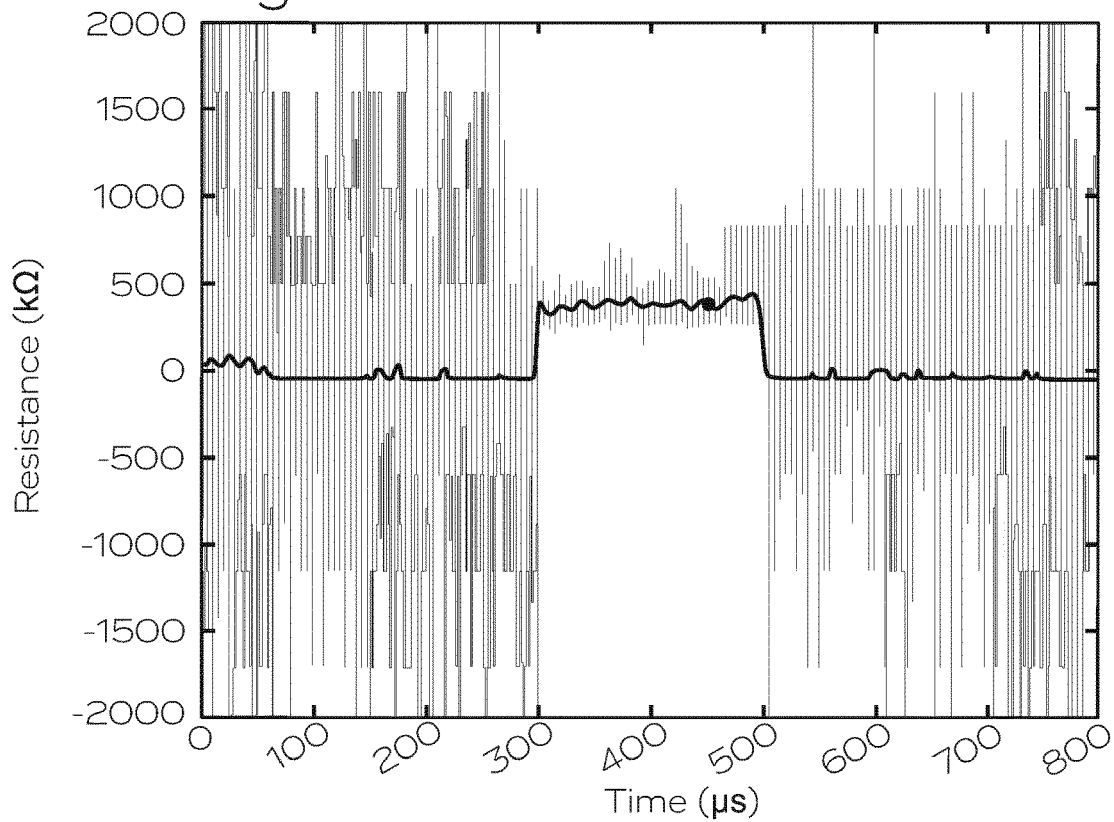

FIG. 5d shows the measured output resistance of the output memristor F in Case 4. Even though both input memristors are 1 (low resistance state), the output remains in the high resistance state it was initialized to. This represents a correct output, which is a logical value of 0 or HRS, which is 382 kΩ according to the measurements of the read signal at the point indicated by the dark dot.

In the foregoing specification, the invention has been described with reference to specific examples of embodiments of the invention. It is evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. The connections may be direct connections or indirect connections. The connections may be illustrated or described in reference to being a single connection, a plurality of connections, unidirectional connections, or bidirectional connections. However, different embodiments may vary the implementation of the connections. Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals.

Therefore, in alternate embodiments, those signals described as positive logic signals may be implemented as negative logic signals, and those signals described as negative logic signals may be implemented as positive logic signals.

Furthermore, those skilled in the art will recognize that boundaries between the above described operations are merely illustrative. The multiple operations may be combined into a single operation, a single operation may be distributed in additional operations and operations may be executed at least partially overlapping in time.

Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

LIST OF NUMERALS

1 First input memristive device (A)
2 Second input memristive device (B)
3 Output memristive device (F)
4 First auxiliary memristive device (C)
5 Second auxiliary memristive device (D)
6 Connection point n
7 Positive supply voltage terminal $V_x$
8 Negative supply voltage terminal $-V_x$
9 Ground contact
10, 10' Logic gate circuit
11 Memory array
12 Switch

The invention claimed is:

1. A memristive logic gate circuit, comprising a first input memristive device, a second input memristive device, and an output memristive device, wherein:
   the first input memristive device and the second input memristive device are connected in series between a positive supply voltage terminal and a negative supply voltage terminal,
   a connection point is formed between the first input memristive device and the second input memristive device,
   at least one first auxiliary memristive device is provided between the connection point and the positive supply voltage terminal, and
   the output memristive device is provided between the connection point and a Ground contact.

2. The memristive logic gate circuit according to claim 1, wherein at least one second auxiliary memristive device is provided between the connection point and the negative supply voltage terminal.

3. The memristive logic gate circuit according to claim 1, wherein one or more of the memristive devices have a bipolar switching characteristics.

4. The memristive logic gate circuit according to claim 1, wherein one or more of the memristive devices switch from a high resistance off-state (HRS) to a low resistance on-state (LRS) when its voltage exceeds a threshold voltage $$V_{th}^{on},$$

where the supply voltage $$V_x \geq V_{th}^{on}.$$

5. The memristive logic gate circuit according to claim 1, wherein the memristive logic gate circuit is adapted to operate as a logic XOR gate, with the first input memristive device representing a first input node A, the second input memristive device representing a second input node B, and the output memristive device representing an output node F.

6. The memristive logic gate circuit according to claim 1, wherein one or more of the memristive devices comprise two or more memristive devices each, which are connected in parallel.

7. The memristive memory device, in particular a memory array, comprising a memristive logic gate circuit according to claim 1 and electronic circuitry to write the state of the first and second input memristive devices and read the state of the output memristive device, in particular a row decoder and a column decoder which are connected to an electronic memory controller.

8. A method for performing a logic operation on a memristive logic gate circuit according to claim 1, wherein the method comprises the steps of using the state of the first input memristive device to represent a logic input node A, using the state of the second input memristive device to represent a logic input node B, and reading the state of the output memristive device.

9. The method according to claim 8, wherein the method comprises the following steps:
   applying an input voltage to the first input memristive device representing the logic input node A,
   applying a second input voltage to the second input memristive device representing the logic input node B, and
   reading the state of the output memristive device representing the logic output node F.

10. The method according to claim 9, wherein the input voltages are provided as a series of short voltage pulses in order to reduce runaway currents in the memristive devices.

11. The method according to claim 9, wherein the voltage to read the output memristive device is provided as a series of short voltage pulses in order to reduce runaway currents in the memristive device.

* * * * *